United States Patent
Nakano (10) Patent No.: US 9,797,332 B2
(45) Date of Patent: Oct. 24, 2017

(54) FUEL INJECTION CONTROL DEVICE AND FUEL INJECTION CONTROL METHOD FOR INTERNAL COMBUSTION ENGINE

(71) Applicant: TOYOTA JIDOSHA KABUSHIKI KAISHA, Toyota-shi (JP)

(72) Inventor: Tomohiro Nakano, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 35 days.

(21) Appl. No.: 15/098,900

(22) Filed: Apr. 14, 2016

(65) Prior Publication Data

US 2016/0312735 A1    Oct. 27, 2016

(30) Foreign Application Priority Data

Apr. 23, 2015 (JP) ................. 2015-088412

(51) Int. Cl.

| F02D 41/24 | (2006.01) |
|---|---|
| F02M 51/06 | (2006.01) |
| F02D 41/12 | (2006.01) |
| F02D 41/38 | (2006.01) |
| F02D 41/40 | (2006.01) |

(52) U.S. Cl.
CPC ......... *F02D 41/2467* (2013.01); *F02D 41/12* (2013.01); *F02D 41/3836* (2013.01); *F02D 41/401* (2013.01); *F02M 51/061* (2013.01); *F02D 2200/0602* (2013.01); *F02D 2200/063* (2013.01); *F02D 2200/0614* (2013.01); *Y02T 10/44* (2013.01)

(58) Field of Classification Search
CPC ...... F02D 41/24; F02D 41/12; F02D 41/2467; F02D 41/3836; F02D 41/401; F02D 2200/063; F02D 2200/0614; F02M 51/06; F02M 51/061; Y02T 10/44

See application file for complete search history.

(56) References Cited

U.S. PATENT DOCUMENTS

| 4,261,314 A * | 4/1981 | Graessley ............. F02D 41/064 |
|---|---|---|
| | | 123/445 |
| 4,726,345 A * | 2/1988 | Masaomi ............ F02D 35/0007 |
| | | 123/198 DB |
| 2015/0267665 A1 | 9/2015 | Abe et al. |

FOREIGN PATENT DOCUMENTS

| JP | 2002-30972 | 1/2002 |
|---|---|---|
| JP | 2014-25419 | 2/2014 |

\* cited by examiner

*Primary Examiner* — Hieu T Vo (74) *Attorney, Agent, or Firm* — Oblon, McClelland, Maier & Neustadt, L.L.P.

(57) ABSTRACT

A control device for an engine includes an ECU. The ECU is configured to: control an actual fuel pressure supplied to a fuel injector to a target fuel pressure; calculate a required energization time required for fuel injection equivalent in amount to a required injection quantity; set a energization time for each injection based on the required energization time; execute a switching processing for switching a manner in which the energization time is set when the required energization time is shorter than a predetermined time; set the required energization time as a set value of the energization time through the switching processing when a deviation between the actual fuel pressure and the target fuel pressure is equal to or larger than a predetermined value; and set the predetermined time as the set value of the energization time when the deviation is less than the predetermined value.

3 Claims, 4 Drawing Sheets

FUEL INJECTION CONTROL DEVICE AND
FUEL INJECTION CONTROL METHOD FOR
INTERNAL COMBUSTION ENGINE

INCORPORATION BY REFERENCE

The disclosure of Japanese Patent Application No. 2015-088412 filed on Apr. 23, 2015 including the specification, drawings and abstract is incorporated herein by reference in its entirety.

BACKGROUND OF THE INVENTION

1. Field of the Invention

This disclosure relates to a fuel injection control device and a fuel injection control method for an internal combustion engine.

2. Description of Related Art

An electromagnetic fuel injection valve that is disposed in an internal combustion engine such as an automotive internal combustion engine is configured to be provided with a valve body which is opened in response to energization of an electromagnetic solenoid and be capable of adjusting a fuel injection quantity by an energization time of the electromagnetic solenoid being changed. The valve body of the fuel injection valve is subjected to a bounce motion immediately after full opening due to a reaction to a collision at a time of arrival at the fully open position. This bounce motion results in a variation of the injection quantity of the fuel injection valve. An effect that this bounce motion has on injection quantity accuracy during full lift injection in which the valve body is at the full opening becomes relatively significant as the injection quantity decreases. An internal combustion engine disclosed in Japanese Patent Application Publication No. 2014-025419, a lower limit (minimum energization time) is provided for the energization time of the fuel injection valve so that the injection quantity variation attributable to the bounce motion is kept at or below an allowable value.

When it comes to an internal combustion engine in which a fuel pumped from a fuel tank by a feed pump is pressurized by a high-pressure fuel pump and supplied to the fuel injection valve, examples of which include an internal combustion engine performing in-cylinder injection, a fuel pressure control is performed so that the fuel supplied to the fuel injection valve has a pressure (actual fuel pressure) controlled to correspond to a target fuel pressure set in accordance with an engine load or the like. During the fuel pressure control, the amount of the fuel discharged from the high-pressure fuel pump is adjusted for the actual fuel pressure to approach the target fuel pressure. At a time of a low load when a required injection quantity per injection is small, the target fuel pressure for the fuel pressure control might be set to a pressure lower than that at a time of a high load such that the energization time required for the injection of the fuel equivalent to a required amount (required energization time) does not fall short of a minimum energization time.

SUMMARY OF THE INVENTION

When the engine load is reduced during vehicle deceleration or the like, fuel consumption decreases, and thus a decline in the actual fuel pressure might take time even if the fuel discharge amount of the high-pressure fuel pump is decreased. When the engine load is reduced, in the meantime, the required injection quantity decreases as well. Accordingly, in the case of a delay in the decline in the actual fuel pressure to the target fuel pressure, the required energization time might become shorter than the minimum energization time. In this case, the fuel injection is performed with the energization time set to the minimum energization time but a discrepancy is caused between the actual injection quantity and the required injection quantity. Then, an air-fuel ratio deviation might be entailed and combustion might be deteriorated.

This disclosure provides a fuel injection control device and a fuel injection control method for an internal combustion engine with which deterioration of combustion at a time of discrepancy between a target fuel pressure and an actual fuel pressure can be suppressed.

A first aspect of the invention provides a fuel injection control device for an internal combustion engine, the internal combustion engine includes an electromagnetic fuel injection valve, the fuel injection control device comprising includes an electronic control unit. The electronic control unit is configured to: control an actual fuel pressure to correspond to a target fuel pressure, the actual fuel pressure is a pressure of a fuel supplied to the electromagnetic fuel injection valve; calculate a required energization time based on a required injection quantity per injection by the electromagnetic fuel injection valve and the actual fuel pressure, the required energization time is an energization time of the electromagnetic fuel injection valve required for fuel injection equivalent in amount to the required injection quantity; set the energization time of the electromagnetic fuel injection valve for each injection based on the required energization time; execute a switching processing for switching a manner in which the energization time is set when the required energization time is shorter than a full lift minimum energization time, the full lift minimum energization time is an energization time set to a period of time longer than the energization time of the electromagnetic fuel injection valve required for a valve body of the electromagnetic fuel injection valve to reach full opening; set the required energization time as a set value of the energization time of the electromagnetic fuel injection valve through the switching processing when a deviation between the actual fuel pressure and the target fuel pressure is equal to or larger than a predetermined value; and set the full lift minimum energization time as the set value of the energization time of the electromagnetic fuel injection valve when the deviation between the actual fuel pressure and the target fuel pressure is less than the predetermined value.

The energization time of the fuel injection valve needs to be longer by at least a certain period of time than the time required for the valve body to remain open and reach the full opening in order for a variation of a fuel injection quantity attributable to a bounce motion at a time when the valve body of the fuel injection valve becomes fully open to be suppressed within an allowable range. Accordingly, for ensuring injection quantity accuracy, it is desirable that the energization time is set with a period of time longer than the energization time of the fuel injection valve required for the valve body to remain open to reach the full opening (full lift minimum energization time) used as a lower limit. Even when the required injection quantity is small as at a time of low load, the energization time can become equal to or longer than the full lift minimum energization time by the actual fuel pressure being reduced and the energization time required for the fuel injection equivalent in amount to the required injection quantity being lengthened. Accordingly, when a fuel pressure control is performed such that the energization time required for the fuel injection equivalent in amount to the required injection quantity becomes at least the full lift minimum energization time, the fuel injection quantity variation attributable to the bounce motion of the valve body can be suppressed within the allowable range.

In the case of a rapid engine load decline or the like, it takes time until the actual fuel pressure is reduced to the target fuel pressure and a state might arise where the actual fuel pressure and the target fuel pressure have a significant discrepancy with respect to each other. In this case, the energization time required for the fuel injection equivalent in amount to the required injection quantity (required injection time) is much below the full lift minimum energization time and the actual injection quantity differs significantly from the required injection quantity in some cases. According to the fuel injection control device described above, the full lift minimum energization time is set as the set value of the energization time of the fuel injection valve pertaining to the case where the required energization time is shorter than the full lift minimum energization time when the deviation between the actual fuel pressure and the target fuel pressure is less than the predetermined value. In contrast, when the deviation is at least the predetermined value the required energization time is set as the set value of the energization time of the fuel injection valve pertaining to the case where the required energization time is shorter than the full lift minimum energization time. In other words, the energization time is set with the full lift minimum energization time usually used as the lower limit, and thus the fuel injection quantity variation attributable to the bounce motion of the valve body is suppressed. In a case where the discrepancy between the actual fuel pressure and the target fuel pressure is significant to the point of the required energization time being much shorter than the full lift minimum energization time, the discrepancy between the required injection quantity and the actual injection quantity is suppressed by setting of an energization time shorter than the full lift minimum energization time being allowed. Accordingly, the fuel injection control device for an internal combustion engine described above can suppress deterioration of combustion at a time of the discrepancy between the target fuel pressure and the actual fuel pressure.

In the fuel injection control device, the electronic control unit may be configured to set the required energization time as the set value of the energization time of the electromagnetic fuel injection valve without executing the switching processing when the required injection quantity is equal to or smaller than a partial lift maximum injection quantity, the partial lift maximum injection quantity may be an injection quantity of the electromagnetic fuel injection valve when the energization time of the electromagnetic fuel injection valve is set to a partial lift maximum energization time, the partial lift maximum energization time may be an energization time shorter than the energization time of the electromagnetic fuel injection valve required for the opening of the valve body to reach the full opening.

A second aspect of the invention provides a fuel injection control method for an internal combustion engine, the internal combustion engine includes an electromagnetic fuel injection valve, the fuel injection control method comprising: controlling an actual fuel pressure to correspond to a target fuel pressure, the actual fuel pressure is a pressure of a fuel supplied to the electromagnetic fuel injection valve; calculating a required energization time based on a required injection quantity per injection by the electromagnetic fuel injection valve and the actual fuel pressure, the required energization time is an energization time of the electromagnetic fuel injection valve required for fuel injection equivalent in amount to the required injection quantity; setting the energization time of the electromagnetic fuel injection valve for each injection based on the required energization time; executing a switching processing for switching a manner in which the energization time is set when the required energization time is shorter than a full lift minimum energization time, the full lift minimum energization time is an energization time set to a period of time longer than the energization time of the electromagnetic fuel injection valve required for a valve body of the electromagnetic fuel injection valve to reach full opening; setting the required energization time as a set value of the energization time of the electromagnetic fuel injection valve through the switching processing when a deviation between the actual fuel pressure and the target fuel pressure is at least a predetermined value; and setting the full lift minimum energization time as the set value of the energization time of the electromagnetic fuel injection valve when the deviation between the actual fuel pressure and the target fuel pressure is less than the predetermined value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
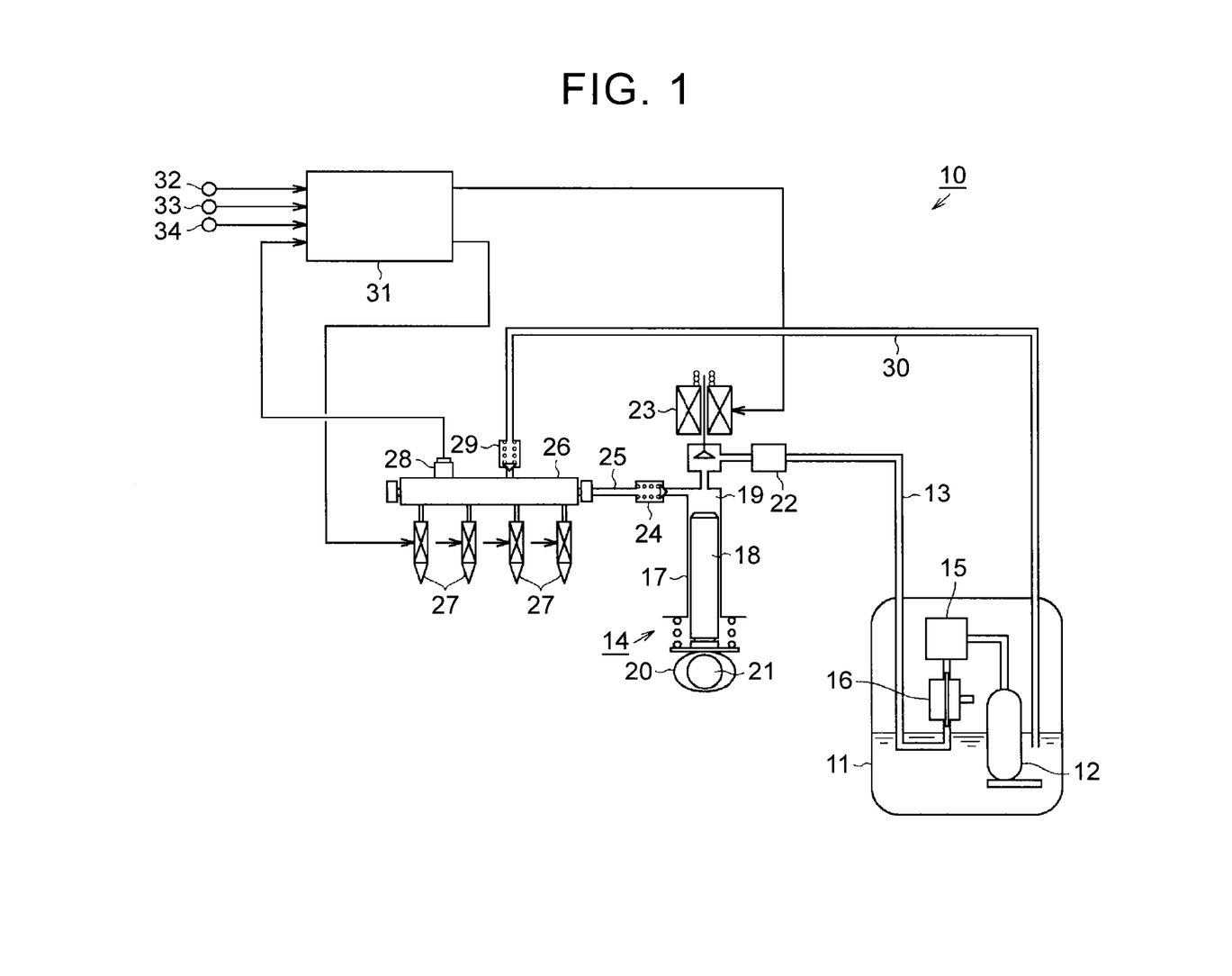
FIG. 1 is a schematic drawing illustrating an overall configuration of a fuel injection control device for an internal combustion engine according to an embodiment.

Hereinafter, an embodiment of a fuel injection control device for an internal combustion engine will be described in detail with reference to FIGS. 1 to 5. As illustrated in FIG. 1, a feed pump 12 is disposed in a fuel tank 11 of an internal combustion engine to which the fuel injection control device according to this embodiment is applied. The feed pump 12 pumps out a fuel in the fuel tank 11 and sends the fuel to a high-pressure fuel pump 14 through a low-pressure fuel passage 13. A filter 15 and a pressure regulator 16 are disposed on the low-pressure fuel passage 13. The filter 15 filters impurities in the fuel. When a pressure (feed pressure) of the fuel flowing through the low-pressure fuel passage 13 is excessive, the pressure regulator 16 is opened for relief of the fuel in the low-pressure fuel passage 13 to the fuel tank 11.

The high-pressure fuel pump 14 is provided with a cylinder 17, a plunger 18 that is placed in the cylinder 17, and a pressurizing chamber 19 that is formed in the cylinder 17 to be partitioned by the plunger 18. The plunger 18 reciprocates along the cylinder 17 in response to rotation of a cam 21 that is disposed in a camshaft 20 of the internal combustion engine, and this allows the plunger 18 to change the volume of the pressurizing chamber 19. In the high-pressure fuel pump 14, the low-pressure fuel passage 13 is connected to a pulsation damper 22 that attenuates a fuel pressure pulsation resulting from a pressurizing operation of the pump. The pulsation damper 22 is connected to the pressurizing chamber 19 via an electromagnetic spill valve 23. The electromagnetic spill valve 23 is a normally open electromagnetic valve. When the electromagnetic spill valve 23 is open, the electromagnetic spill valve 23 allows the pulsation damper 22 and the pressurizing chamber 19 to communicate with each other. When the electromagnetic spill valve 23 is closed, the electromagnetic spill valve 23 blocks the communication between the pulsation damper 22 and the pressurizing chamber 19. In the high-pressure fuel pump 14, the pressurizing chamber 19 is connected to a high-pressure fuel passage 25 via a check valve 24 that is opened when the pressure of the fuel therein becomes equal to or higher than a predetermined discharge pressure. The high-pressure fuel pump 14 is connected to a high-pressure fuel pipe 26 via the high-pressure fuel passage 25.

Fuel injection valves (fuel injector) 27 for respective cylinders of an internal combustion engine 10 are connected to the high-pressure fuel pipe 26. These fuel injection valves 27 are electromagnetic fuel injection valves for in-cylinder injection that inject the fuel into the cylinders in response to energization. A fuel pressure sensor 28 and a relief valve 29 are disposed on the high-pressure fuel pipe 26 as well. The fuel pressure sensor 28 detects the pressure of the fuel in the high-pressure fuel pipe 26 (actual fuel pressure Pf). When the fuel pressure becomes at least a predetermined relief pressure, the relief valve 29 is opened and returns the fuel in the high-pressure fuel pipe 26 to the fuel tank 11 through a drain passage 30.

In the internal combustion engine 10, the high-pressure fuel pump 14 performs the fuel pressurizing operation as follows. In the following description, a movement of the plunger 18 that causes the volume of the pressurizing chamber 19 to expand will be referred to as a fall of the plunger 18, and a movement of the plunger 18 that causes the volume of the pressurizing chamber 19 to shrink will be referred to as a rise of the plunger 18. During the fall of the plunger 18, the energization of the electromagnetic spill valve 23 is stopped and pressurizing chamber 19 communicates with the low-pressure fuel passage 13 via the open electromagnetic spill valve 23. When the volume of the pressurizing chamber 19 expands with the plunger 18 falling in this state, the fuel that is pumped out from the fuel tank 11 by the feed pump 12 is suctioned into the pressurizing chamber 19. Once the plunger 18 rises after falling, the volume of the pressurizing chamber 19 shrinks in response to the rise of the plunger 18. If the state where the energization of the electromagnetic spill valve 23 is stopped continues at this time, the fuel in the pressurizing chamber 19 returns to the low-pressure fuel passage 13 through the open electromagnetic spill valve 23. When the energization of the electromagnetic spill valve 23 is initiated during the rise of the plunger 18, the communication between the pressurizing chamber 19 and the low-pressure fuel passage 13 is blocked by the closed electromagnetic spill valve 23 and the pressurizing chamber 19 is sealed from the outside. Then, the pressure of the fuel in the pressurizing chamber 19 rises in response to the shrinkage of the volume of the pressurizing chamber 19. Once the pressure in the pressurizing chamber 19 reaches the discharge pressure of the check valve 24, the check valve 24 is opened and the fuel in the pressurizing chamber 19 is discharged toward the high-pressure fuel passage 25. When the plunger 18 falls after rising, the energization of the electromagnetic spill valve 23 is stopped. Then, the fuel in the low-pressure fuel passage 13 begins to be suctioned into the pressurizing chamber 19 again. The high-pressure fuel pump 14 supplies the high-pressure fuel to the high-pressure fuel pipe 26 by repeating the pressurizing operation based on the suctioning and discharge of the fuel. In the high-pressure fuel pump 14, a fuel discharge amount per pressurizing operation is changed when an energization initiation timing of the electromagnetic spill valve 23 during a period in which the plunger 18 rises is changed.

The fuel injection control device according to this embodiment that is applied to the internal combustion engine 10 which has the above-described configuration is provided with an electronic control unit 31. The electronic control unit 31 is provided with a central processing unit, a read-only memory, a readable and writable memory, an input port, and an output port. The central processing unit performs various types of calculation processing. A program and data for control are stored in the read-only memory. The readable and writable memory temporarily stores a result of the calculation by the central processing unit, a result of detection by an external sensor, and the like. The input port receives a signal from the outside, and the output port transmits a signal to the outside. Detections signals from various sensors such as a crank angle sensor 32, an air flow meter 33, and an accelerator pedal sensor 34 as well as the above-described fuel pressure sensor 28 are input to the input port of the electronic control unit 31. The crank angle sensor 32 detects an angle of rotation of a crankshaft (crank angle) of the internal combustion engine 10, and the air flow meter 33 detects the amount of air suctioned into the internal combustion engine 10. The accelerator pedal sensor 34 detects an amount by which an accelerator pedal is depressed by a driver. The electronic control unit 31 calculates and obtains a rotation speed of the internal combustion engine 10 (engine rotation speed NE), a load of the internal combustion engine 10 (engine load KL), and the like based on detection results of these sensors. Then, the electronic control unit 31 performs a fuel pressure control and a fuel injection quantity control based on a result of the calculation.

During the fuel pressure control, the electronic control unit 31 calculates a target fuel pressure Pt, which is a target value of the actual fuel pressure Pf, based on the engine load KL and the like first. Basically, the target fuel pressure Pt is set to a low pressure at a time of a low load when fuel consumption is small. Then, the electronic control unit 31 adjusts the energization initiation timing of the electromagnetic spill valve 23 in the period of the rise of the plunger 18 in accordance with a deviation between the target fuel pressure Pt and the value of the actual fuel pressure Pf detected by the fuel pressure sensor 28. Specifically, when the actual fuel pressure Pf is lower than the target fuel pressure Pt, the electronic control unit 31 advances the energization initiation timing of the electromagnetic spill valve 23 and increases the fuel discharge amount of the high-pressure fuel pump 14. When the actual fuel pressure Pf is higher than the target fuel pressure Pt, the electronic control unit 31 delays the energization initiation timing of the electromagnetic spill valve 23 and decreases the fuel discharge amount of the high-pressure fuel pump 14.

Accordingly, when a state where a fuel injection quantity of the fuel injection valves 27 is steady continues, a balance is achieved between the amount of the fuel consumed by fuel injection and the amount of the fuel supplied from the high-pressure fuel pump 14 in a state where the actual fuel pressure Pf corresponds to the target fuel pressure Pt.

During the injection quantity control, the electronic control unit 31 calculates an injection initiation timing and a required injection quantity Qt, which is a required fuel injection quantity value, based on the engine rotation speed NE, the engine load KL, and the like. The electronic control unit 31 calculates, based on the actual fuel pressure Pf, an energization time for the fuel injection valves 27 during which the fuel equivalent in amount to the required injection quantity Qt can be injected (required energization time Tt), and energizes the fuel injection valves 27 for a period continuing until the elapse of the calculated energization time from the injection initiation timing.

The electromagnetic fuel injection valve 27 has a structural lower limit in terms of the injection quantity at which a variation of the injection quantity can be suppressed. The fuel injection control device according to this embodiment employs a partial lift injection technique that allows high-accuracy trace injection surpassing that limit.

Figure 2:
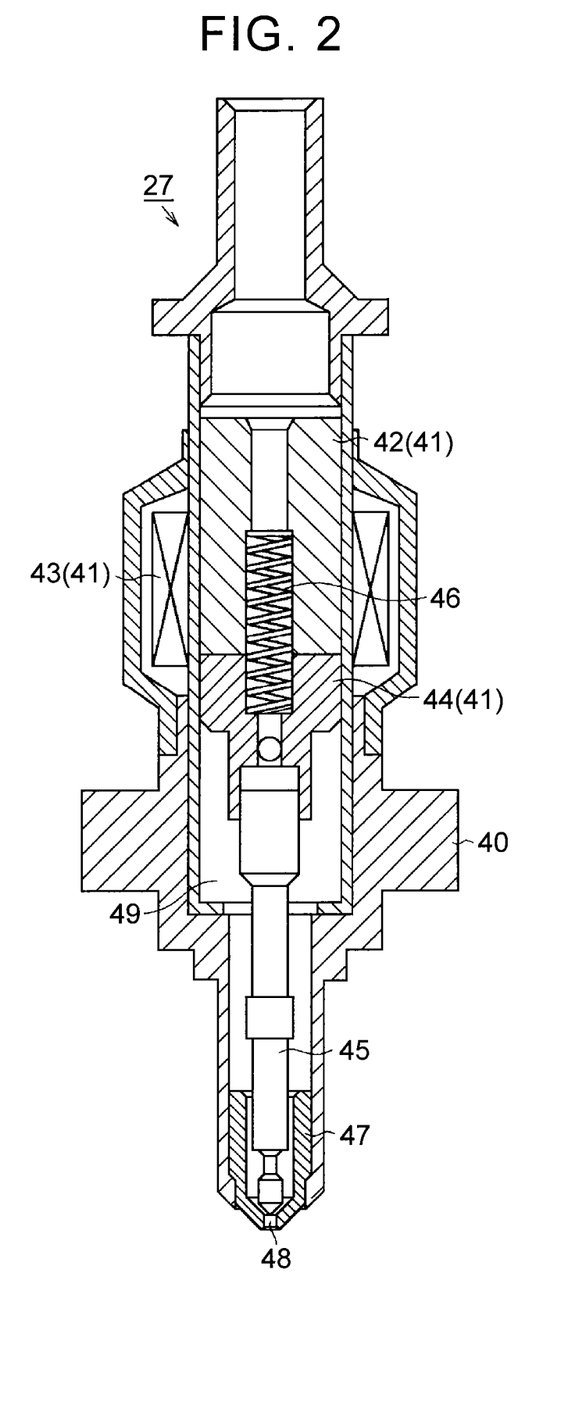
FIG. 2 is a sectional view illustrating a sectional structure of a fuel injection valve that is disposed in the internal combustion engine to which the embodiment is applied.

A sectional structure of the fuel injection valve 27 is illustrated in FIG. 2. As illustrated in FIG. 2, an electromagnetic solenoid 41 is disposed in a housing 40 of the fuel injection valve 27. The electromagnetic solenoid 41 is provided with a fixed core 42 that is fixed to the housing 40, an electromagnetic coil 43 that is disposed around the fixed core 42, and a movable core 44 that is disposed adjacent to the fixed core 42. In the housing 40, the movable core 44 is installed to be capable of being displaced in the vertical direction of FIG. 2. A valve body 45 is integrated with the movable core 44 and is connected to the movable core 44 to be capable of displacement. A spring 46 is disposed in the housing 40 and the spring 46 biases the movable core 44 at all times toward a side of separation from the fixed core 42 (lower side in FIG. 2). A fuel chamber 49, into which the high-pressure fuel sent from the high-pressure fuel pipe 26 is introduced, is formed in the housing 40.

A nozzle body 47 is attached to a tip part of the housing 40 (lower end part in the drawing) to surround a tip part of the valve body 45. A slit-shaped injection hole 48 is formed at a tip of the nozzle body 47 so that the inside and outside of the nozzle body 47 communicate with each other.

The valve body 45 of the fuel injection valve 27 is configured to be capable of being displaced within a range of a fully closed position at which a tip of the valve body 45 abuts against (is seated on) the nozzle body 47 to a fully open position at which the movable core 44 abuts against the fixed core 42. Once the tip of the valve body 45 leaves (is lifted from) the nozzle body 47, the injection hole 48 communicates with the fuel chamber 49 and the fuel introduced into the fuel chamber 49 is injected to the outside through the injection hole 48. Once the valve body 45 is displaced to reach the fully closed position and is seated onto the nozzle body 47, the communication between the injection hole 48 and the fuel chamber 49 is blocked and the fuel injection is stopped. In the following description, the amount of the displacement of the valve body 45 from the fully closed position will be referred to as a nozzle lift amount.

Figure 3:
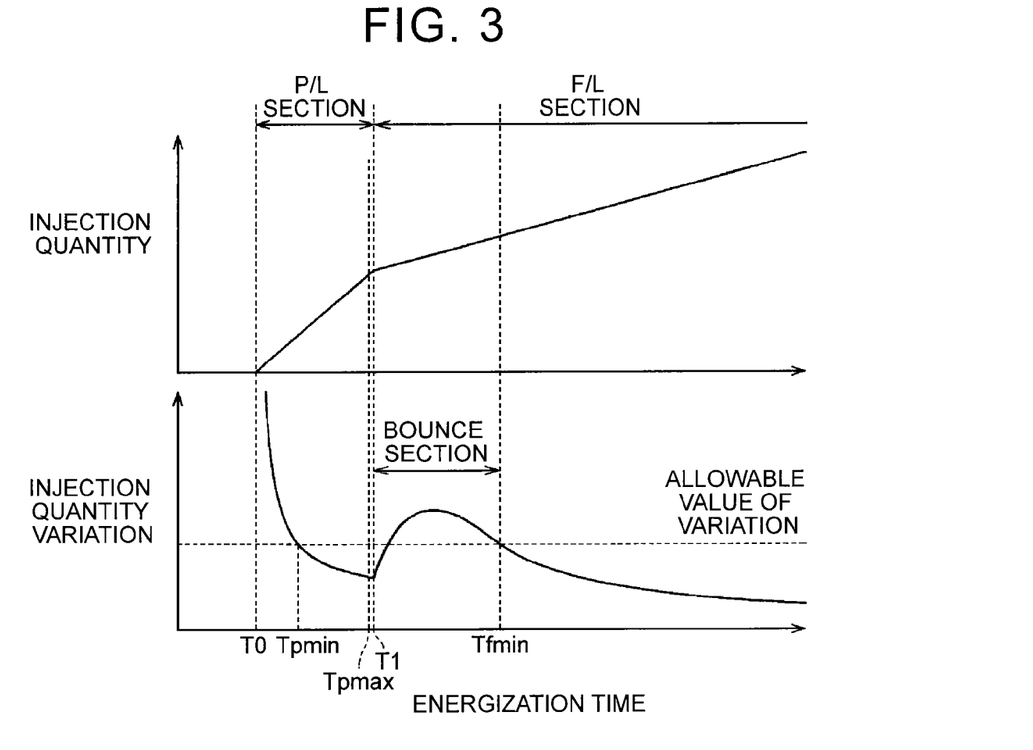
FIG. 3 is a graph illustrating a relationship of an injection quantity of the fuel injection valve and a variation of the injection quantity to an energization time.

As illustrated in FIG. 3, the injection quantity of the fuel injection valve 27 changes as follows with respect to the energization time. After the energization is initiated, the lifting of the valve body 45 is initiated with a slight delay. Herein, the energization time that is required for the initiation of the lifting of the valve body 45 will be referred to as a lift initiation time T0. Once the energization time exceeds the lift initiation time T0, the nozzle lift amount gradually increases in response to an increase in the energization time, and the valve body 45 reaches the fully open position soon. Herein, the energization time that is required for the valve body 45 to be opened until the valve body 45 becomes fully open will be referred to as a full opening arrival time T1. In the energization time section falling short of the lift initiation time T0, the valve body 45 is not lifted, and thus the injection quantity is "0". In the energization time section from the lift initiation time T0 to the full opening arrival time T1, the nozzle lift amount changes during the energization, and thus the rate of change in the injection quantity with respect to the energization time is relatively high. In the section of the energization time subsequent to the full opening arrival time T1, the nozzle lift amount is maintained at an amount at a time of full opening, and thus the rate of change in the injection quantity with respect to the energization time is relatively low. In the following description, the energization time section from the lift initiation time T0 at which the valve body 45 has yet to be fully open to the full opening arrival time T1 will be referred to as a "partial lift (P/L) section" while the energization time section subsequent to the full opening arrival time T1 at which the valve body 45 is fully opened will be referred to as a "full lift (F/L) section".

As illustrated in FIG. 3, the variation of the injection quantity of the fuel injection valve 27 changes as follows with respect to the energization time. A certain degree of the variation, which is attributable to a supply voltage variation or the like, is present at the lift initiation time T0, and this variation of the lift initiation time T0 results in the variation of the injection quantity in the P/L section. Still, this variation of the injection quantity in the P/L section becomes relatively small in response to an increase in the injection quantity. Accordingly, although the injection quantity variation is extremely large when the energization time is the lift initiation time T0, the injection quantity variation gradually decreases as the energization time approaches the full opening arrival time T1. Immediately after the valve body 45 reaches the fully open position, a bounce motion of the valve body 45 occurs due to a reaction to a collision of the movable core 44 with the fixed core 42 at the time when the valve body 45 reaches the fully open position, and then a minute vibration of the nozzle lift amount is generated. Accordingly, once the energization time exceeds the full opening arrival time T1, the injection quantity variation temporarily increases. The effect that the bounce motion of the valve body 45 has on the injection quantity variation relatively decreases as the injection quantity increases. Accordingly, the injection quantity variation decreases again once the energization time exceeds the full opening arrival time T1 and becomes longer than a certain degree. Accordingly, when the fuel injection is performed with the energization time set to at least a specified time longer than the full opening arrival time T1 (F/L minimum energization time Tfmin), the injection quantity variation can be kept at or below an allowable value.

As described above, the injection quantity variation is relatively small, even in the P/L section, during the energization time immediately before the energization time enters the F/L section. Accordingly, the injection quantity variation can be kept at or below an allowable upper limit value even when the fuel injection is performed with the energization time of the electromagnetic solenoid 41 set within a range falling short of the full opening arrival time T1 but equal to or longer than a specified time (P/L minimum energization time Tpmin). In the fuel injection control device according to this embodiment, the injection of a trace amount of the fuel during which the valve body 45 has yet to reach the full opening with the energization time set in the P/L section, which is so-called partial lift injection, is executed if necessary. The full opening arrival time T1 is subjected to a variation as is the case with the lift initiation time T0, and thus a time that is slightly shorter than an assumed value of the full opening arrival time T1 is set as an upper limit value of the energization time for the partial lift injection (P/L maximum energization time Tpmax) in view of this variation.

In the following description, the energization time range from the P/L minimum energization time Tpmin to the P/L maximum energization time Tpmax in which the partial lift injection can be executed with the injection quantity variation kept at or below the allowable value will be referred to as a "P/L injection possible range". In addition, the range of the energization time equal to or longer than the F/L minimum energization time Tfmin in which the full lift injection can be carried out with the injection quantity variation kept at or below the allowable value will be referred to as a "F/L injection possible range". Furthermore, the energization time section between the P/L injection possible range and the F/L injection possible range in which the injection quantity variation exceeds the allowable value, that is, the section from the P/L maximum energization time Tpmax to the F/L minimum energization time Tfmin will be referred to as a "bounce section".

Figure 4:
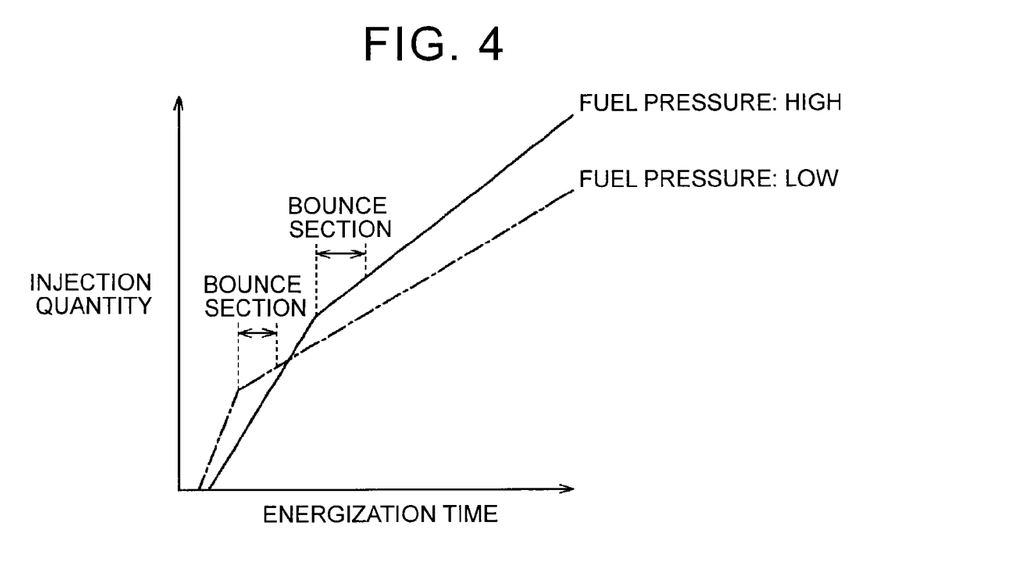
FIG. 4 is a graph illustrating a relationship between the energization time and the injection quantity of the fuel injection valve at a time of a high fuel pressure and a relationship between the energization time and the injection quantity of the fuel injection valve at a time of a low fuel pressure.

Relationships between the injection quantity of the fuel injection valve 27 and the energization time at a time of a high fuel pressure and at a time of a low fuel pressure are illustrated in FIG. 4. The fuel pressure in the fuel chamber 49 acts on the valve body 45 as a resistance to the lifting of the valve body 45, and thus the lift initiation time T0, the P/L minimum energization time Tpmin, the P/L maximum energization time Tpmax, and the F/L minimum energization time Tfmin increase as the actual fuel pressure Pf becomes higher. As a result, the bounce section of the energization time also changes toward a side of a longer energization time as the actual fuel pressure Pf becomes higher.

During the above-described injection quantity control, the electronic control unit 31 calculates the required injection quantity Qt based on the engine rotation speed NE, the engine load KL, and the like. The calculation of the required injection quantity Qt at this time is performed such that the required energization time Tt is out of the bounce section in a state where the actual fuel pressure Pf is the target fuel pressure Pt at the current engine load KL. Because the fuel consumption decreases when the engine load KL is reduced during vehicle deceleration or the like, a decline in the actual fuel pressure Pf might take time even if the fuel discharge amount of the high-pressure fuel pump 14 is decreased in accordance with a decline in the target fuel pressure Pt. When the engine load KL is reduced, in the meantime, the required injection quantity Qt decreases as well. Accordingly, in the case of a delay in the decline in the actual fuel pressure Pf to the target fuel pressure Pt, the required energization time Tt might enter the bounce section even when the required injection quantity Qt has a value originally set for the required energization time Tt to be out of the bounce section. In other words, in a case where the actual fuel pressure Pf is higher than the target fuel pressure Pt, the required energization time Tt is shorter than in a case where the actual fuel pressure Pf corresponds to the target fuel pressure Pt and the F/L minimum energization time Tfmin, which is the upper limit value of the energization time in the bounce section, becomes longer. Accordingly, in a state where the decline in the actual fuel pressure Pf to the target fuel pressure Pt is delayed, the required energization time Tt falls short of the F/L minimum energization time Tfmin in some cases. When the required energization time Tt itself is set as a set value of the energization time of the fuel injection valve 27 in this case, an air-fuel ratio deviation might occur and combustion might deteriorate due to a decline in injection quantity accuracy. In this regard, in this embodiment, the energization time of the fuel injection valve 27 is set in the following manner so that the combustion deterioration at a time of discrepancy between the target fuel pressure Pt and the actual fuel pressure Pf is suppressed.

Figure 5:
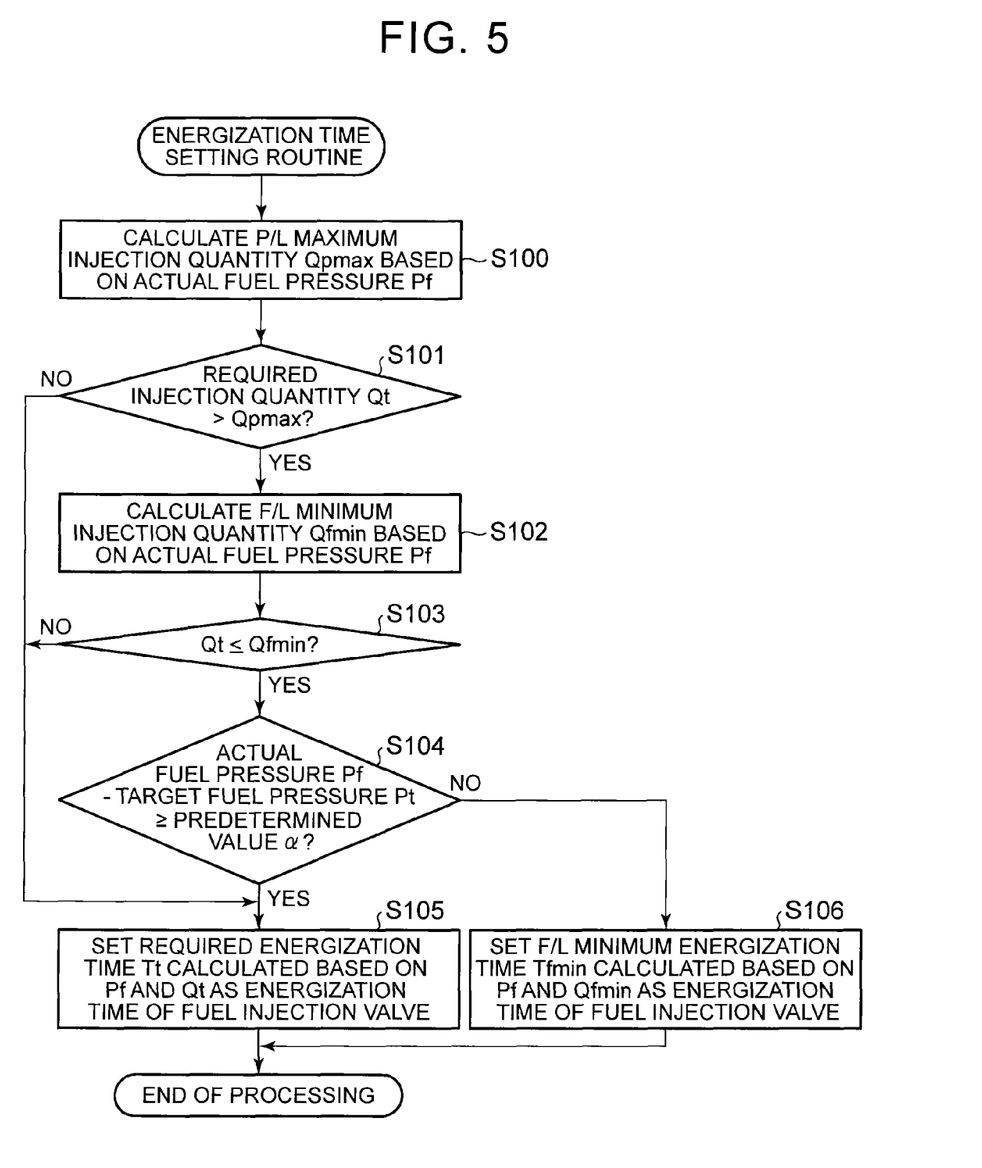
FIG. 5 is a flowchart of an energization time setting routine that is executed by the fuel injection control device for an internal combustion engine according to this embodiment.

FIG. 5 shows a flowchart of an energization time setting routine that the fuel injection control device according to this embodiment executes during the setting of the energization time for the fuel injection valve 27. The electronic control unit 31 repeatedly executes the processing of this routine at a specified control cycle while the internal combustion engine 10 is in operation.

In Step S100, which is the first step following the initiation of this routine, a P/L maximum injection quantity Qpmax is calculated from the actual fuel pressure Pf. The P/L maximum injection quantity Qpmax represents the injection quantity of the fuel injection valve 27 at a time when the energization time is the P/L maximum energization time Tpmax at the current actual fuel pressure Pf. A value of the P/L maximum injection quantity Qpmax is calculated by the use of a map for P/L maximum injection quantity calculation that is stored in the read-only memory of the electronic control unit 31. The value of the P/L maximum injection quantity Qpmax by actual fuel pressure Pf obtained in advance through an experiment or the like is stored in this map.

In the subsequent step of Step S101, it is determined whether or not the required injection quantity Qt exceeds the P/L maximum injection quantity Qpmax. In other words, it is determined whether or not the required energization time Tt at the current actual fuel pressure Pf exceeds the P/L maximum energization time Tpmax that is the upper limit value of the P/L injection possible range.

When the required injection quantity Qt is equal to or smaller than the P/L maximum injection quantity Qpmax (S101: NO), the fuel injection equivalent in amount to the required injection quantity Qt can be performed by the partial lift injection with the energization time set within the P/L injection possible range. At this time, the processing proceeds to Step S105, the required energization time Tt calculated based on the actual fuel pressure Pf and the required injection quantity Qt is set as the set value of the energization time of the fuel injection valve 27 in Step S105, and then the processing of the current cycle of this routine is terminated.

The processing proceeds to Step S102 in a case where the required injection quantity Qt exceeds the P/L maximum injection quantity Qpmax (S101: YES). After the processing proceeds to Step S102, a F/L minimum injection quantity Qfmin is calculated based on the actual fuel pressure Pf in Step S102. The F/L minimum injection quantity Qfmin represents the injection quantity of the fuel injection valve 27 at a time when the energization time is the F/L minimum energization time Tfmin at the current actual fuel pressure Pf. A value of the F/L minimum injection quantity Qfmin is calculated by the use of a map for F/L minimum injection quantity calculation that is stored in the read-only memory of the electronic control unit 31. The value of the F/L minimum injection quantity Qfmin by actual fuel pressure Pf obtained in advance through an experiment or the like is stored in this map.

In the subsequent step of Step S103, it is determined whether or not the required injection quantity Qt is smaller than the F/L minimum injection quantity Qfmin. In other words, it is determined whether or not the energization time of the fuel injection valve 27 required for the injection of the fuel equivalent in amount to the required injection quantity Qt is shorter than the F/L minimum energization time Tfmin at the current actual fuel pressure Pf.

In a case where the required injection quantity Qt is equal to or larger than the F/L minimum injection quantity Qfmin (S103: NO), the fuel injection equivalent in amount to the required injection quantity Qt can be performed by the full lift injection with the energization time set in the F/L injection possible range. At this time, the required energization time Tt calculated based on the actual fuel pressure Pf and the required injection quantity Qt is set as the set value of the energization time of the fuel injection valve 27 in Step S105 described above, and then the processing of the current cycle of this routine is terminated.

If the required injection quantity Qt is smaller than the F/L minimum injection quantity Qfmin (S103: YES), the energization time required for the fuel injection equivalent in amount to the required injection quantity Qt is in the bounce section. In this case, the processing proceeds to Step S104. In Step S104, it is determined whether or not the deviation between the actual fuel pressure Pf and the target fuel pressure Pt (=Pf−Pt) is at least a predetermined value α. When the deviation is at least the predetermined value α (S104: YES), the required energization time Tt calculated based on the actual fuel pressure Pf and the required injection quantity Qt is set as the set value of the energization time of the fuel injection valve 27 in Step S105 described above, and then the processing of the current cycle of this routine is terminated. When the deviation is less than the predetermined value α (S104: NO), the processing proceeds to Step S106. Then, the F/L minimum energization time Tfmin calculated based on the actual fuel pressure Pf and the F/L minimum injection quantity Qfmin is set as the set value of the energization time of the fuel injection valve 27 in Step S106, and then the processing of the current cycle of this routine is terminated. The F/L minimum energization time Tfmin is the energization time of the fuel injection valve 27 required for the fuel injection equivalent in amount to the F/L minimum injection quantity Qfmin at the current actual fuel pressure Pf, and the value thereof is calculated by the use of a map for F/L minimum energization time calculation that is stored in the read-only memory of the electronic control unit 31. The value of the F/L minimum energization time Tfmin by actual fuel pressure Pf obtained in advance through an experiment or the like is stored in this map.

Hereinafter, an effect of the fuel injection control device for an internal combustion engine according to this embodiment that has the above-described configuration will be described. As described above, the value of the required injection quantity Qt is set for the required energization time Tt to be out of the bounce section in a state where the actual fuel pressure Pf corresponds to the target fuel pressure Pt. Still, in a state where the actual fuel pressure Pf is discrepant from the target fuel pressure Pt, the required energization time Tt is in the bounce section and the deterioration of combustion might occur due to a decline in injection quantity accuracy. When a lower limit guard for the energization time at a time of the full lift injection is performed based on the F/L minimum energization time Tfmin, that is, when the F/L minimum energization time Tfmin is set as the set value of the energization time of the fuel injection valve 27 in a case where the required energization time Tt is shorter than the F/L minimum energization time Tfmin, the energization time being in the bounce section is avoidable. Still, in this case, the injection quantity deviates from the required injection quantity Qt by an amount corresponding to the difference between the required energization time Tt and the F/L minimum energization time Tfmin. Accordingly, in a case where the difference between the required injection quantity Qt and the F/L minimum injection quantity Qfmin exceeds the injection quantity deviation that can result from the injection quantity variation, the injection quantity accuracy is rather deteriorated as a result of the lower limit guard for the energization time described above.

As described above, the energization time of the fuel injection valve 27 required for the fuel injection equivalent in amount to the required injection quantity Qt decreases and the F/L minimum energization time Tfmin increases as the actual fuel pressure Pf becomes higher than the target fuel pressure Pt. Accordingly, the occurrence of the above-described situation in which the injection quantity accuracy is rather deteriorated as a result of the lower limit guard is limited to a time when the discrepancy between the actual fuel pressure Pf and the target fuel pressure Pt exceeds a certain degree. A minimum value of the amount of the discrepancy between the actual fuel pressure Pf and the target fuel pressure Pt at which the above-described deterioration of the injection quantity accuracy resulting from the lower limit guard of the energization time can occur is set to the predetermined value α used for the determination of Step S104 of the above-described energization time setting routine.

In the fuel injection control device according to this embodiment, in contrast, the manner in which the energization time is set is switched as follows in a case where the required injection quantity Qt is smaller than the F/L minimum injection quantity Qfmin, that is, in a case where the required energization time Tt is shorter than the F/L minimum energization time Tfmin. The required energization time Tt is set as the set value of the energization time of the fuel injection valve 27 when the deviation between the actual fuel pressure Pf and the target fuel pressure Pt is at least the predetermined value α and the F/L minimum energization time Tfmin is set as the set value of the energization time of the fuel injection valve 27 when the deviation between the actual fuel pressure Pf and the target fuel pressure Pt is less than the predetermined value α. Accordingly, the lower limit guard described above is performed only in a case where the injection quantity accuracy is not deteriorated as a result of the lower limit guard.

The fuel injection control device according to this embodiment employs the partial lift injection technique, and allows high-accuracy fuel injection based on the partial lift injection in a case where the required injection quantity Qt is equal to or smaller than the P/L maximum injection quantity Qpmax, that is, in a case where the required energization time Tt is equal to or shorter than the P/L maximum energization time Tpmax. Accordingly, in a case where the required injection quantity Qt is equal to or smaller than the P/L maximum injection quantity Qpmax, the required energization time Tt is set as the set value of the energization time of the fuel injection valve 27 without the switching of the manner of the energization time setting in accordance with the deviation between the actual fuel pressure Pf and the target fuel pressure Pt described above being executed.

In this embodiment, the electronic control unit 31 is a configuration that corresponds to a fuel pressure control unit and an energization time setting unit. In addition, the determination in Step S104 of the energization time setting routine illustrated in FIG. 5 and the processing in Step S105 and Step S106 associated with the setting of the energization time subsequent to the reception of the determination result therefrom correspond to a switching processing for switching the energization time setting manner.

The fuel injection control device for an internal combustion engine according to this embodiment described above can achieve the following effects. In this embodiment, the switching processing for switching the energization time setting manner is executed in a case where the required energization time Tt is shorter than the F/L minimum energization time Tfmin. This switching processing is performed such that the required energization time Tt is set as the set value of the energization time of the fuel injection valve 27 when the deviation between the actual fuel pressure Pf and the target fuel pressure Pt is at least the predetermined value a and the F/L minimum energization time Tfmin is set as the set value of the energization time of the fuel injection valve 27 when the deviation is less than the predetermined value α. Accordingly, the deterioration of combustion at a time of discrepancy between the target fuel pressure Pt and the actual fuel pressure Pf can be suppressed.

In this embodiment, the required energization time Tt is set as the set value of the energization time of the fuel injection valve 27, without the switching processing being executed, in a case where the required energization time Tt is equal to or shorter than the P/L maximum energization time Tpmax. Accordingly, high-accuracy trace injection can be performed.

The above-described embodiment can be carried out through the following modification as well. The energization time setting routine illustrated in FIG. 5 may be modified such that the P/L maximum energization time Tpmax is calculated in Step S100 and it is determined in Step S101 whether or not the required energization time Tt is longer than the P/L maximum energization time Tpmax.

Likewise, the energization time setting routine illustrated in FIG. 5 may be modified such that the F/L minimum energization time Tfmin is calculated in Step S102 and it is determined in Step S103 whether or not the required energization time Tt is shorter than the F/L minimum energization time Tfmin.

The processing of Step S100 and Step S101 according to the energization time setting routine that is illustrated in FIG. 5 may be omitted when the partial lift injection is not performed.

What is claimed is:

1. A fuel injection control device for an internal combustion engine, the internal combustion engine including an electromagnetic fuel injection valve, the fuel injection control device comprising
an electronic control unit configured to:
control an actual fuel pressure to correspond to a target fuel pressure, the actual fuel pressure being a pressure of a fuel supplied to the electromagnetic fuel injection valve;
calculate a required energization time based on a required injection quantity per injection by the electromagnetic fuel injection valve and the actual fuel pressure, the required energization time being an energization time of the electromagnetic fuel injection valve required for fuel injection equivalent in amount to the required injection quantity;
set the energization time of the electromagnetic fuel injection valve for each injection based on the required energization time;
execute a switching processing for switching a manner in which the energization time is set when the required energization time is shorter than a full lift minimum energization time, the full lift minimum energization time being an energization time set to a period of time longer than the energization time of the electromagnetic fuel injection valve required for a valve body of the electromagnetic fuel injection valve to reach full opening;
set the required energization time as a set value of the energization time of the electromagnetic fuel injection valve through the switching processing when a deviation between the actual fuel pressure and the target fuel pressure is equal to or larger than a predetermined value; and
set the full lift minimum energization time as the set value of the energization time of the electromagnetic fuel injection valve when the deviation between the actual fuel pressure and the target fuel pressure is less than the predetermined value.

2. The fuel injection control device according to claim 1, wherein the electronic control unit is configured to set the required energization time as the set value of the energization time of the electromagnetic fuel injection valve without executing the switching processing when the required injection quantity is equal to or smaller than a partial lift maximum injection quantity,
the partial lift maximum injection quantity is an injection quantity of the electromagnetic fuel injection valve when the energization time of the electromagnetic fuel injection valve is set to a partial lift maximum energization time,
the partial lift maximum energization time is an energization time shorter than the energization time of the electromagnetic fuel injection valve required for the opening of the valve body to reach the full opening.

3. A fuel injection control method for an internal combustion engine, the internal combustion engine including an electromagnetic fuel injection valve and an electronic control unit, the fuel injection control method comprising:
controlling, by the electronic control unit, an actual fuel pressure to correspond to a target fuel pressure, the actual fuel pressure being a pressure of a fuel supplied to the electromagnetic fuel injection valve;
calculating, by the electronic control unit, a required energization time based on a required injection quantity per injection by the electromagnetic fuel injection valve and the actual fuel pressure, the required energization time being an energization time of the electromagnetic fuel injection valve required for fuel injection equivalent in amount to the required injection quantity;
setting, by the electronic control unit, the energization time of the electromagnetic fuel injection valve for each injection based on the required energization time;
executing, by the electronic control unit, a switching processing for switching a manner in which the energization time is set when the required energization time is shorter than a full lift minimum energization time, the full lift minimum energization time being an energization time set to a period of time longer than the energization time of the electromagnetic fuel injection valve required for a valve body of the electromagnetic fuel injection valve to reach full opening;

setting, by the electronic control unit, the required energization time as a set value of the energization time of the electromagnetic fuel injection valve through the switching processing when a deviation between the actual fuel pressure and the target fuel pressure is at least a predetermined value; and setting, by the electronic control unit, the full lift minimum energization time as the set value of the energization time of the electromagnetic fuel injection valve when the deviation between the actual fuel pressure and the target fuel pressure is less than the predetermined value.

* * * * *